United States Patent

Jax et al.

Patent Number: 5,992,217
Date of Patent: Nov. 30, 1999

[54] DEVICE AND METHOD FOR LEAKAGE DETECTION

[75] Inventors: Peter Jax, Erlangen; Walter Knoblach, Forchheim, both of Germany

[73] Assignee: Siemens Aktiengesellschaft, Munich, Germany

[21] Appl. No.: 09/160,874

[22] Filed: Sep. 25, 1998

Related U.S. Application Data

[63] Continuation of application No. PCT/DE97/00536, Mar. 17, 1997.

[30] Foreign Application Priority Data

Mar. 26, 1996 [DE] Germany ............ 196 11 981
Oct. 22, 1996 [DE] Germany ............ 196 43 637

[51] Int. Cl.⁶ ............ G01M 3/04; G01M 3/08; G01M 7/00
[52] U.S. Cl. ............ 73/40; 73/40.5 R; 422/83
[58] Field of Search ............ 73/40, 40.5 R, 73/41.4, 45.1, 45.2, 49.1, 49.2, 49.3, 49.5; 422/83, 88, 94; 436/3, 144

[56] References Cited

U.S. PATENT DOCUMENTS 5,271,901  12/1993  Issel et al. ............ 422/83

*Primary Examiner*—Michael Brock
*Assistant Examiner*—Jay L. Politzer
*Attorney, Agent, or Firm*—Herbert L. Lerner; Laurence A. Greenberg

[57] ABSTRACT

A device and a method for leakage detection and leakage location in an installation, in particular in a pipeline, include a collecting line which is permeable to a substance and is connected to a pump and to a sensor for the substance. A metal wire is disposed outside and along the collecting line and is connected to a negative pole of a direct current source. When a solution, for example salt water, emerges from a leak in a pipeline, a gas, in particular hydrogen, is obtained by electrolysis at the metal wire. A concentration maximum of the gas in the collecting line is then detected and located.

16 Claims, 2 Drawing Sheets

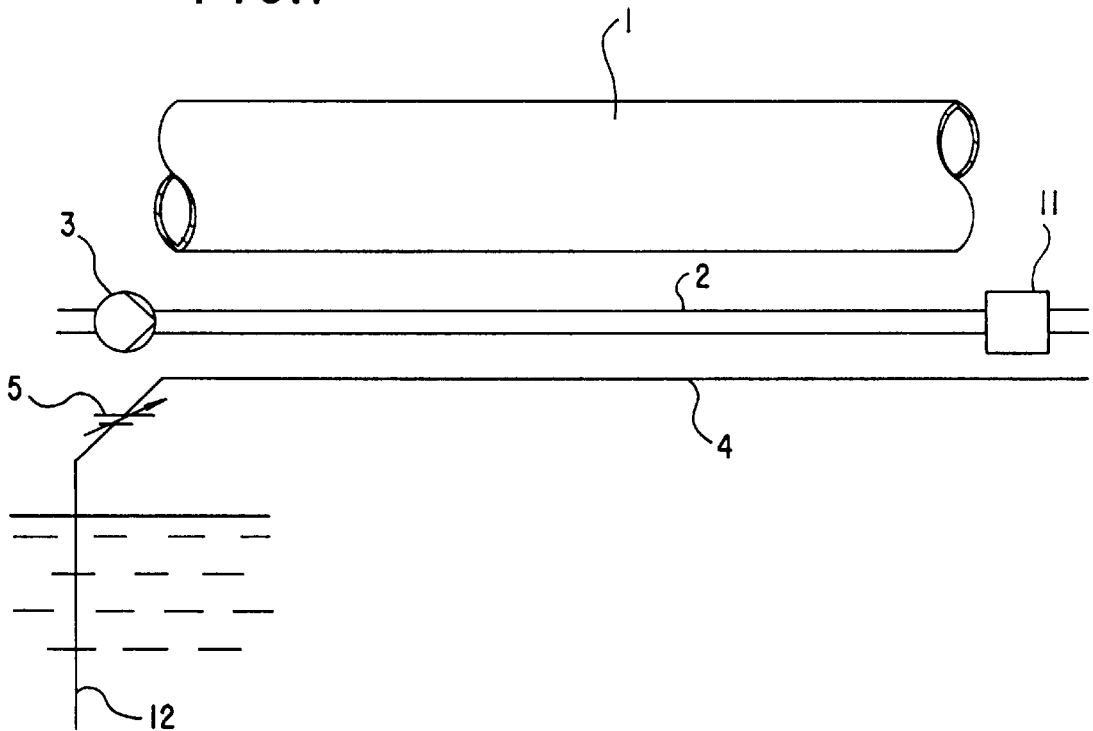
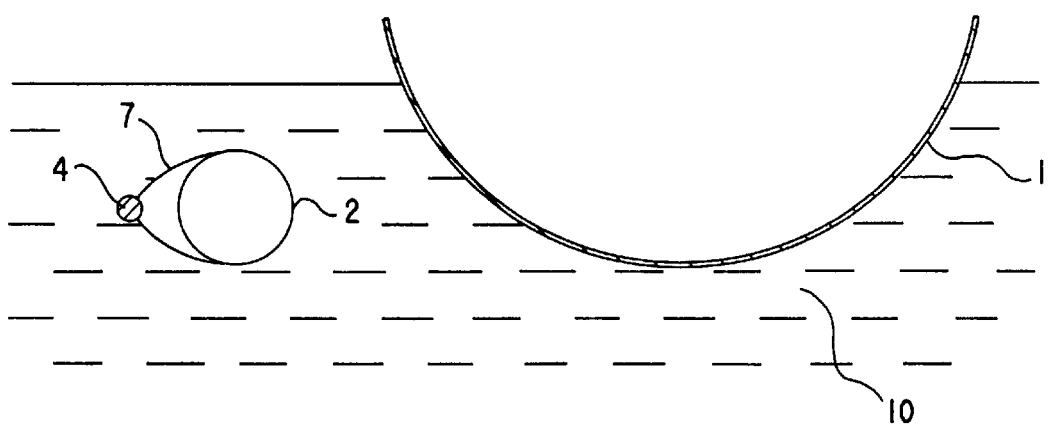

DEVICE AND METHOD FOR LEAKAGE DETECTION

CROSS-REFERENCE TO RELATED APPLICATION

This application is a continuation of copending International Application No. PCT/DE97/00536, filed Mar. 17, 1997, which designated the United States.

BACKGROUND OF THE INVENTION

1. Field of the Invention

The invention relates to a device for leakage detection and leakage location in an installation, in particular in a pipeline, including a collecting line which is permeable to a substance and is connected to a pump and to a sensor for the substance. The invention also relates to a method for leakage detection and leakage location in an installation, in particular in a pipeline, which includes detecting and locating a concentration maximum of a substance which has penetrated into a permeable collecting line.

German Patent 24 31 907 discloses a leakage detection and location system (LEOS). That system contains a collecting line which is permeable to substances that are to be detected. Volumes of a transport medium which is air, for example, can be conveyed one after another through the collecting line by a pump connected to the collecting line. At least one sensor which is disposed at the end of the collecting line detects substances that have penetrated into the collecting line. The collecting line is disposed in the vicinity of an installation to be monitored, in particular along a pipeline. In the event of a leak in the installation or in the pipeline, the substance that has emerged from the leak then passes to the collecting line and penetrates into the collecting line. As a result, a concentration maximum of the substance forms in the vicinity of the leak, in the collecting line which is laid there. During the next pumping operation of the leakage detection and location system, that concentration maximum passes to the sensor. The location of the leakage can be determined from the time which elapses between switching on the pump and the sensor responding.

That known system can be used only when the installation to be monitored contains a substance which on one hand can penetrate into the collecting line, and on the other hand can be detected by a sensor.

European Patent 0 525 593 B1, corresponding to U.S. Pat. No. 5,271,901, discloses a device with which acid that has emerged from a leak can be detected and the leak can be located, during the use of the leakage detection and location system (LEOS). That is possible as a result of the fact that a material which reacts chemically in the event of contact with the acid, forming a detectable substance to which the collecting line is permeable, is placed in the vicinity of the collecting line. That material may be zinc, in particular a zinc wire. That is because zinc reacts with acid, forming hydrogen, which can be detected in a simple way by using the known leakage detection and location system.

Heretofore, it has not been possible to use the known leakage detection and location system to detect solutions which have emerged from a leak and may be neutral or even alkaline. Such a solution, which is transported through a pipeline, may be salt water, for example. During the production of underground gas reservoirs for natural gas, it is specifically often necessary to remove salt water which contains up to 300 g of salt per liter. For that reason, it is often necessary for a salt-water line to be led over very great distances, for example as far as the sea. Since the salt water can damage plants, it is necessary to monitor those salt-water lines, in order to be able to detect and locate a leak rapidly and reliably.

SUMMARY OF THE INVENTION

It is accordingly an object of the invention to provide a device and a method for leakage detection, which overcome the hereinafore-mentioned disadvantages of the heretofore-known methods and devices of this general type and which make it possible for the known leak detection and location system (LEOS) to detect solutions which do not need to be acid, for example salt water.

With the foregoing and other objects in view there is provided, in accordance with the invention, a device for leakage detection and leakage location (LEOS) in an installation or system, in particular in a pipeline, comprising a collecting line permeable to a substance; a pump connected to the collecting line; a sensor connected to the collecting line for sensing the substance; a metal wire disposed outside and along the collecting line; and a direct current source having a negative pole connected to the metal wire.

In the event that a solution, for example a salt solution, emerges from the pipeline to be monitored, and that solution contacts the wire at any point, electrolysis occurs there. That causes hydrogen to be generated on the metal wire, which acts as a cathode and is connected to the negative pole of the direct current source. Even small quantities of hydrogen are sufficient to penetrate into the collecting line, which is permeable to hydrogen. During the next flushing operation, the hydrogen that has collected in the collecting line at the location of the leak passes to the sensor, which detects the hydrogen. The location of the leak is then determined in the usual way.

The invention achieves the advantage of making it possible to locate a leak at a container or at a pipeline if a solution, in particular salt water, emerges from the leak. The solution does not need to be acid.

It is sufficient for the direct current source to supply a voltage which is less than 48 volts. A small, cost-effective direct current source will therefore be adequate.

In accordance with another feature of the invention, the collecting channel is disposed underneath the collecting line and the metal wire associated with the latter. This means that, after a leak, the emerging liquid always wets the metal wire.

In accordance with a further feature of the invention, the collecting line and the metal wire are surrounded by an absorbent material, for example sand. The capillary forces in the absorbent material ensure that an adequate amount of leakage liquid always reaches to the metal wire and, consequently, sufficient hydrogen is produced.

In accordance with an added feature of the invention, the collecting line, together with the metal wire, are disposed along a pipeline in the 8 o'clock to 9 o'clock position or in the 3 o'clock to 4 o'clock position. On one hand, the advantage of such a positioning is that rainwater can seep away into the ground without triggering an indication of a leakage. On the other hand, if a relatively large amount of liquid is released as a result of a leak, it backs up as far as the collecting line, so that a leakage can be detected and located. That positioning of the collecting line can be used particularly advantageously when the pipeline and the collecting line are disposed in a sand bed.

In accordance with an additional feature of the invention, the collecting line with the metal wire is disposed underneath a pipeline. This ensures that liquid emerging from a leak reaches the metal wire.

In accordance with yet another feature of the invention, the direct current source is variable. As a result, the amount of hydrogen produced can be adjusted to the sensitivity of the system including the collecting line and the sensor.

In order to prevent falsification of the measurement results by rainwater in which salts can be dissolved, hydrogen concentrations that are low and uniformly distributed over the length of the collecting line are not taken into account for detecting a leak. Only local large maxima of the hydrogen concentration are viewed as an indicator of a leak.

If a collecting channel is used for the solution, the collecting channel can have an outlet at its lowest point. The outlet is constructed in such a way that the input of liquid as a result of rain immediately flows out again through the channel. The metal wire, which is disposed in the collecting channel together with the collecting line, is then not covered by a solution. It is only in the event of a leak in the pipeline or installation that is disposed above the collecting channel that so much solution will get into the collecting channel that more runs in than can run out. As a result, the metal wire is covered by the solution, and hydrogen, which can be detected, is generated. This achieves the advantage of ensuring that no erroneous measurements can occur, even in the event of rain.

In accordance with yet a further feature of the invention, there is provided a metal electrode, which is to be disposed in the ground and is, for example, connected to the positive pole of the direct current source. This achieves the significant advantage that it is only the positive metal electrode, and not the metal wire disposed along the collecting line, which can dissolve, even in the case of a very long operating time of the device. As in the case of cathode protection for metal lines, which is known per se, the metal part that is connected to the negative pole of a direct current source is not corroded.

In particular, this achieves the advantage of permitting the metal electrode, which is disposed at a known point in the ground and may be formed of a metal rod, for example, to be easily replaced when it is severely corroded. Consequently, it is not necessary to replace the metal wire that is disposed on the collecting line, which would be very costly because of the length of the collecting line and therefore of the metal wire, which is generally very great. Furthermore, the collecting line and the metal wire are often disposed underground, and are therefore difficult to access.

In accordance with yet an added feature of the invention, the positive pole of the direct current source can be connected to a further metal wire, which is disposed outside and along the collecting line, at a distance from the metal wire that is connected to the negative pole.

The two wires do not touch. Additionally, there is no connection between the wires at the end of the wires opposite the direct current source. For example, the two metal wires may run parallel to each other.

In accordance with yet an additional feature of the invention, the two metal wires are formed of different metals. A separate direct current source is then not necessary. The wires themselves then form a voltage source, because of the different levels of the two metals in the electrochemical series. It is then advantageously possible to manage without a separate voltage source.

In accordance with again another feature of the invention, one metal wire is formed of copper, for example, and the other of zinc-plated copper. Surface changes on the metal wires then do not occur.

In accordance with again a further feature of the invention, there is provided an ammeter incorporated into at least one of the metal wires. This is because if the leakage liquid which runs out of a leak is electrically conductive, the two metal wires are conductively connected by the leakage liquid, and the ammeter indicates a current flux. If the voltage is suitably selected, the current intensity may lie between 1 mA and 20 mA. Irrespective of the presence of an ammeter, hydrogen is produced by electrolysis and makes determination of the leakage location possible.

The advantage which is achieved by the current measurement is that it is possible to detect reliably, in a short time, whether or not there is a leak anywhere. This is because a measurable current intensity occurs in the metal wires when a conductive liquid connects the latter. It is then advantageously possible to determine the leakage location by carrying out a measurement using a LEOS only when the ammeter has registered a rise in current intensity. This measurement involves flushing the collecting line and registering the arrival at the sensor of an increased hydrogen concentration.

Consequently, it is not necessary to flush the collecting line at regular intervals. It is sufficient to initiate a flushing operation when a leak has been indicated by the electrical measurement.

A leak can also be located much more rapidly than heretofore.

Even if no leak is determined, the collecting line should be flushed with fresh air approximately every seven days, in order to prevent the formation of condensation in the line. It is also possible to seal off the collecting line at both ends after it has been filled with dry air, when no measurement is being carried out.

In accordance with again an added feature of the invention, a direct current source, which is associated with an ammeter, is connected to each end of the pair of metal wires in turn.

Should the two wires be connected to each other by conductive liquid at a leakage location, the leakage location can then be determined electrically from the measured current intensities, if the resistance of the metal wires per unit length is known. It is therefore possible to determine the leakage location twice, electrically and by using the leakage detection and location system (LEOS), and therefore to increase the measurement accuracy.

The wires, or the individual wire, can be fixed to the collecting line by plastic tapes, for example by a network made of plastic tapes, which run around the collecting line. This also provides mechanical protection.

With the objects of the invention in view, there is also provided a method for leakage detection and leakage location in an installation or system, in particular in a pipeline, which comprises obtaining a gas, for example hydrogen, by electrolysis from a solution having emerged from a leak; and detecting and locating a concentration maximum of the gas having penetrated into a permeable collecting line.

The concentration maximum of the gas in the collecting line is detected and located, for example with the aid of a leakage detection and location system (LEOS) that is known per se. The location of the leakage is detected from the time difference between switching on the pump of the leakage detection and location system and the arrival of a concentration maximum of the gas at the sensor.

The advantage which is achieved in particular by using the device and using the method according to the invention is that solutions, in particular salt water, that emerge from a leak can be detected reliably, and the leakage location can be determined.

Other features which are considered as characteristic for the invention are set forth in the appended claims.

Although the invention is illustrated and described herein as embodied in a device and a method for leakage detection, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIGS. 1 and 2 are fragmentary, diagrammatic and schematic views of two versions of a device for leakage detection and leakage location according to the invention on a salt-water line;

FIG. 3 is an enlarged, fragmentary, sectional view of a configuration of a collecting line, which is associated with a metal wire, alongside a salt-water line;

DESCRIPTION OF THE PREFERRED EMBODIMENTS

Figure 2:
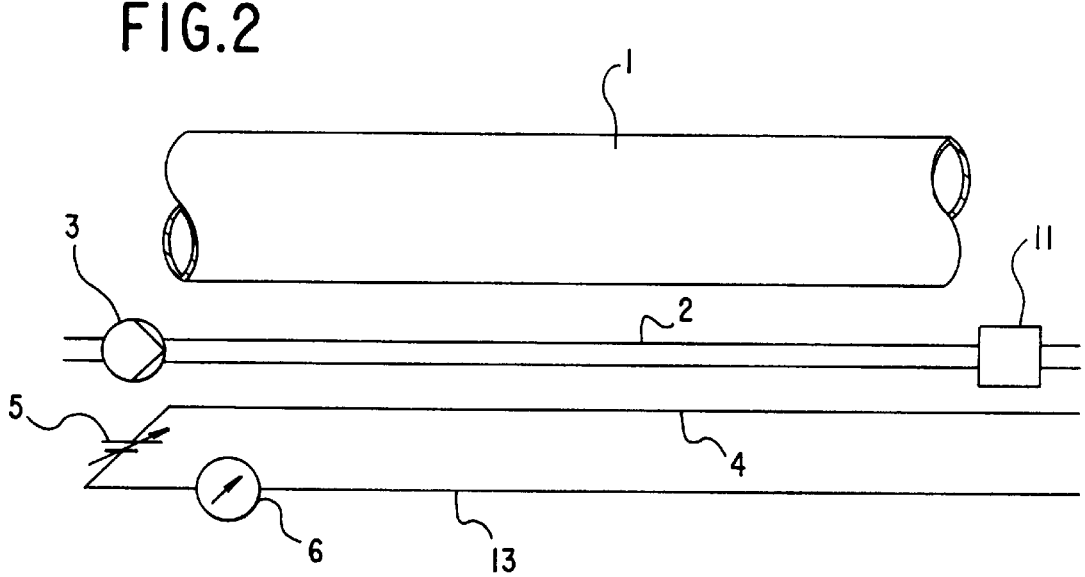

Referring now to the figures of the drawings in detail and first, particularly, to FIGS. 1 and 2 thereof, there is seen a salt-water line 1, on which leaks are to be detected and located. This saltwater line 1 is associated with a leakage detection and location system (LEOS) that is known per se. The LEOS includes a permeable collecting line 2, which is laid along the salt-water line 1. The collecting line 2 is connected to a pump 3, with which a volume of a transport medium, that is usually dry air, is pumped through the collecting line 2 at intervals. A sensor 11 is disposed at an end of the collecting line 2.

The collecting line 2 is permeable to substances to be detected. When such a substance to be detected penetrates into the collecting line 2 at a specific location, a concentration maximum of the substance builds up there. During the next pumping operation, this concentration maximum is transported to the sensor 11 and registered there. Given a known flow velocity in the collecting line 2, that location at which the substance has penetrated into the collecting line 2 is determined from a time difference between the beginning of the pumping operation and the registration of the maximum in the sensor 11.

If a substance to which the LEOS responds is transported in a line to be monitored, it is possible for a leakage location to be determined reliably.

However, salt water cannot be detected by using the LEOS on its own. The device of FIG. 1 therefore provides a metal wire 4 which is disposed outside and along the collecting line 2 and is connected to a negative pole of a direct current source, in particular of a direct-current voltage source 5.

The positive pole of this direct current source 5 is connected to a metal electrode 12, which can be disposed at any location in the ground. For example, the metal electrode 12 can simply be pushed into the ground.

In the event that salt water emerges from a leak in the salt-water line 1, the metal wire 4 comes into contact with the salt water at the location of the leak. Electrolysis then occurs, with hydrogen being formed.

The collecting line 2 that is used is permeable to hydrogen. The hydrogen that is produced by the electrolysis therefore penetrates into the collecting line 2 and there forms a concentration maximum at the position of the leak in the salt-water line 1. During the subsequent pumping operation, the hydrogen concentration maximum passes to the sensor 11, which is a hydrogen sensor. The location of the leakage is then determined in the manner outlined.

It is only the metal electrode 12 that is connected to the positive pole which is corroded as a result of the electrolysis. The metal electrode 12 can be replaced in a simple manner in the event that corrosion has progressed to a great extent. The metal wire 4, which is connected to the negative pole, is very long and is only accessible with difficulty, does not corrode. Consequently, no replacement of the metal wire 4 is required, even in the event of a long operating period.

The device of FIG. 2 provides two metal wires 4 and 13, which are connected to a direct current source 5 and are disposed at a distance outside and along the collecting line 2.

In the event that salt water emerges from a leak in the salt-water line 1, the two wires 4 and 13 are connected to each other by the salt water at the location of the leakage. Electrolysis then takes place there, with hydrogen being formed. Otherwise, the device of FIG. 2 operates like that of FIG. 1.

An ammeter 6 is, for example, incorporated in one of the two metal wires 4, 13. Since salt water is electrically conductive, a conductive connection between the metal wires 4 and 13 occurs in the region of the leak in the salt-water line 1. The current which flows as a result is registered by the ammeter 6. A current flux therefore indicates that there is a leak present somewhere in the salt-water line 1.

The locating of the leak is then carried out by using the system which has been outlined (LEOS). It is possible for regular pumping operations to be dispensed with on the basis of the current measurement. It is only when the presence of a leak has been detected by the current flux that a pumping operation is initiated, in order to determine the location of the leak. However, it is moreover possible for the salt-water line 1 to be shut down immediately following the current flux in the ammeter 6, in order to avoid the further emergence of salt water. The determination of the location of the leak then serves to ascertain the location at which repair is necessary.

If the direct current source 5 is variable, the amount of hydrogen that is produced by electrolysis can be set to the sensitivity of the system (LEOS).

FIG. 3 shows a cross section in which the collecting line 2 is in the eight o'clock position in relation to the salt-water line 1. As is shown in FIG. 1, the collecting line 2 is associated with a metal wire 4. This metal wire 4 is fastened to the collecting line 2 by using plastic tapes 7. The collecting line 2, with the metal wire 4, is embedded in absorbent material 10, for example in sand, which reaches as far as the salt-water line 1 and also surrounds the latter, at least underneath. The sand bed permits rainwater to seep into the ground without a build-up of wetness. It is only in the event of leakage in the salt-water line 1 that the great quantity of water which then emerges builds up as far as the collecting line or sensor hose 2.

Figure 4:
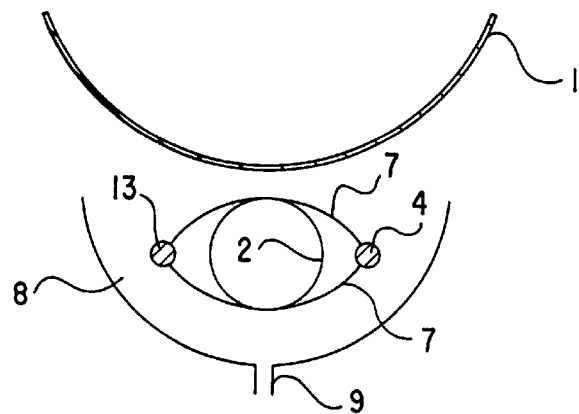
FIG. 4 is a sectional view of a configuration of a collecting line, which is associated with two metal wires, underneath a salt-water line.

FIG. 4 shows a cross section in which the collecting line 2 is underneath the salt-water line 1. The collecting line 2 is associated with two metal wires 4 and 13, as is shown in FIG. 2. To this end, the wires are fastened to the collecting line 2 by using plastic tapes 7. A collecting channel 8 which is disposed underneath the collecting line 2 and the metal wires 4 and 13, has an outlet opening 9. Should rainwater get into the collecting channel 8, it will flow away immediately through the outlet opening 9. However, in the event of a leak in the salt-water line 1, so much salt water gets into the collecting channel 8 that the water level in the collecting channel 8 reaches the metal wires 4 and 13 relatively quickly, so that hydrogen is generated. Erroneous measurements as a result of rainwater are avoided in this way.

Figure 5:
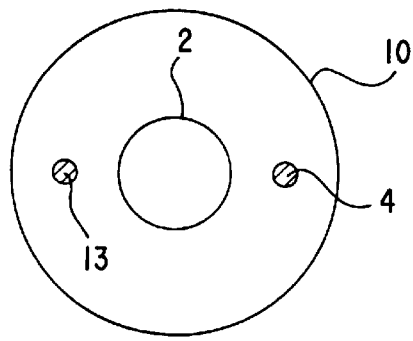
FIG. 5 is a sectional view of a configuration of a collecting line, which is associated with two metal wires, in absorbent material.

FIG. 5 shows a configuration including a collecting line 2 and metal wires 4 and 13, which are surrounded by an absorbent material 10. This absorbent material 10 absorbs the salt water emerging from a leak and has the effect, as does the collecting channel 8, of causing the salt water to be in contact with the metal wires 4 and 13 for as long as possible in order to produce hydrogen.

The embodiment of FIG. 3 may have a collecting line 2 which is associated with two metal wires 4 and 13, as is shown in FIGS. 2, 4 and 5. Likewise, the embodiments of FIGS. 4 and 5 may have a collecting line 2 which is associated with only one metal wire 4, as is shown in FIGS. 1 and 3.

It is also possible for the voltage at the voltage source 5 to be set in such a way that, given the occurrence of rainwater, the hydrogen production is not sufficient for a measurable concentration maximum in the collecting line 2. It is only when salt water from the salt-water line 1, which contains considerably more salts, reaches the metal wire 4 that a measurable amount of hydrogen is then produced.

It is possible for a leak in the salt-water line 1 to be detected and located reliably by using the device according to the invention.

We claim:

1. A device for leakage detection and leakage location in an installation, comprising:

a collecting line permeable to a substance;

a pump connected to said collecting line;

a sensor connected to said collecting line for sensing the substance;

a metal wire disposed outside and along said collecting line; and a direct current source having a negative pole connected to said metal wire.

2. The device according to claim 1, wherein said collecting line is disposed in the vicinity of a pipeline of the installation.

3. The device according to claim 1, including a collecting channel disposed underneath said collecting line and said metal wire.

4. The device according to claim 1, including an absorbent material surrounding said collecting line and said metal wire.

5. The device according to claim 4, wherein said collecting line and said metal wire are disposed together along a pipeline of the installation between an 8 o'clock and a 9 o'clock position.

6. The device according to claim 4, wherein said collecting line and said metal wire are disposed together along a pipeline of the installation between a 3 o'clock and a 4 o'clock position.

7. The device according to claim 1, wherein said collecting line and said metal wire are disposed underneath a pipeline of the installation.

8. The device according to claim 1, wherein said direct current source is variable.

9. The device according to claim 1, including a metal electrode to be disposed in the ground, said direct current source having a positive pole connected to said metal electrode.

10. The device according to claim 1, including a further metal wire disposed outside and along said collecting line at a distance from said metal wire connected to the negative pole of said direct current source, said direct current source having a positive pole connected to said further metal wire.

11. The device according to claim 10, wherein said metal wires are formed of different metals.

12. The device according to claim 11, wherein one of said metal wires is formed of copper and the other of said metal wires is formed of zinc-plated copper.

13. The device according to claim 10, including an ammeter incorporated into at least one of said metal wires.

14. The device according to claim 10, wherein each of said two metal wires have a first and a second end and said direct current source associated with an ammeter is connectable to said first or second ends of said metal wires in turn.

15. A method for leakage detection and leakage location in an installation, which comprises:

obtaining a gas by electrolysis from a solution having emerged from a leak; and detecting and locating a concentration maximum of the gas having penetrated into a permeable collecting line.

16. The method according to claim 15, which comprises carrying out the obtaining step by electrolysis from a solution having emerged from a leak in a pipeline of the installation.

* * * * *